US012131621B2

United States Patent

(12) United States Patent
Kunze et al.

(10) Patent No.: US 12,131,621 B2
(45) Date of Patent: Oct. 29, 2024

(54) METHOD FOR AUTOMATIC IDENTIFICATION OF FIRE DETECTORS

(71) Applicant: Siemens Schweiz AG, Zürich (CH)

(72) Inventors: Axel Kunze, Zürich (CH); Andreas Huber, Flurlingen (CH)

(73) Assignee: SIEMENS SCHWEIZ AG, Zurich (CH)

( * ) Notice: Subject to any disclaimer, the term of this patent is extended or adjusted under 35 U.S.C. 154(b) by 26 days.

(21) Appl. No.: 18/003,977

(22) PCT Filed: May 12, 2021

(86) PCT No.: PCT/EP2021/062717
§ 371 (c)(1),
(2) Date: Dec. 30, 2022

(87) PCT Pub. No.: WO2022/002471
PCT Pub. Date: Jan. 6, 2022

(65) Prior Publication Data

US 2023/0326327 A1    Oct. 12, 2023

(30) Foreign Application Priority Data

Jul. 3, 2020 (EP) .................................... 20183864

(51) Int. Cl.
*G08B 25/04* (2006.01)
*G08B 25/00* (2006.01)
*G08B 17/00* (2006.01)

(52) U.S. Cl.
CPC ........... *G08B 25/04* (2013.01); *G08B 25/003* (2013.01); *G08B 17/00* (2013.01)

(58) Field of Classification Search
CPC ...... G08B 25/003; G08B 25/04; G08B 25/03; G08B 26/005; G08B 17/00
See application file for complete search history.

(56) References Cited

U.S. PATENT DOCUMENTS 5,402,101 A * 3/1995 Berger ................. G08B 26/001 340/508
7,286,050 B2 * 10/2007 Faltesek ................. G08B 25/14 340/539.2

(Continued)

FOREIGN PATENT DOCUMENTS

DE 40 38 992 2/1992
EP 1 174 838 1/2002 ............. G08B 25/00
EP 1 703 481 9/2006 ............. G08B 29/18

OTHER PUBLICATIONS

Search Report for International Application No. PCT/EP2021/062717, 11 pages, Aug. 26, 2021.

*Primary Examiner* — John A Tweel, Jr.
(74) *Attorney, Agent, or Firm* — Slayden Grubert Beard PLLC

(57) ABSTRACT

Various embodiments include a method for automatic identification of fire detectors in a fire alarm system of a building, wherein the fire alarm system includes a plurality of fire detectors, a panel, and a transmission line. The method may include: determining linear distance spacings between fire detectors using a floor plan; determining line distances between fire detectors by measurement along the transmission line; using the line distances to determine a fire detector sequence; and creating a graph using the distance spacings and the line distances with a set of potential connection orders. The method may include determining a potential connection order matching the fire detector sequence based on the set of potential connection orders and determining a correspondence of the designations representing the identification of the fire detectors.

8 Claims, 6 Drawing Sheets

(56) References Cited

U.S. PATENT DOCUMENTS

| | | | | |
|---|---|---|---|---|
| 8,443,110 | B2 * | 5/2013 | Grinberg | G06F 13/42<br>370/256 |
| 9,245,427 | B2 * | 1/2016 | Yu | H04J 3/0667 |
| 10,496,953 | B1 * | 12/2019 | Hahn | H04L 67/306 |
| 2011/0267169 | A1 | 11/2011 | Kästli | G05B 23/02 |

* cited by examiner

FIG 3

20

| | | | | |
|---|---|---|---|---|
| Z | → | M1 | : | 15 m |
| Z | → | M5 | : | 30 m |
| M1 | → | M2 | : | 8 m |
| M1 | → | M3 | : | 6 m |
| M2 | → | M3 | : | 2 m |
| M3 | → | M4 | : | 8 m |
| M3 | → | M5 | : | 5 m |
| M4 | → | M5 | : | 8 m |
| M5 | → | Z | : | 30 m |

30

| | | | | | |
|---|---|---|---|---|---|
| (1) | Z | → | MA | : | 20 m |
| (2) | MA | → | MB | : | 10 m |
| (3) | MB | → | MC | : | 3 m |
| (4) | MC | → | MD | : | 10 m |
| (5) | MD | → | ME | : | 10 m |
| (6; N=6) | ME | → | Z | : | 35 m |

METHOD FOR AUTOMATIC IDENTIFICATION OF FIRE DETECTORS

CROSS-REFERENCE TO RELATED APPLICATIONS

This application is a U.S. National Stage Application of International Application No. PCT/EP2021/062717 filed May 12, 2021, which designates the United States of America, and claims priority to EP Application No. 20183864.6 filed Jul. 3, 2020, the contents of which are hereby incorporated by reference in their entirety.

TECHNICAL FIELD

The present disclosure relates to fire detectors. Various embodiments of the teachings herein include methods for automatic identification of fire detectors in a fire alarm system.

BACKGROUND

In a fire alarm system, the fire detectors are typically connected to a bus line. The bus line is connected to a central unit, referred to below in brief as a panel. The bus line is connected to the panel as a ring. The bus line thus starts from the panel and ends at the panel. A transmission of data and/or energy via the bus line and starting from the panel is basically possible in each of the two conceivable directions. In this way, in the event of a defect of the bus line, data and/or energy can be transmitted, starting from the panel, into the two segments of the bus line resulting from the defect. The bus line is referred to below as the transmission line. By virtue of the ring-type topology (if there is no error situation) the transmission line is also a ring transmission line. Branch lines can branch off from said line.

German patent DE 40 38 992 C1 discloses a method for automatic assignment of detector addresses in a hazard warning system with a panel and at least one primary alarm line connected thereto, on which a number of hazard detectors formed with at least one transmission facility, a measured value memory, an address memory, a voltage measurement facility and a switch are arranged. An idle voltage is applied to the line in a first phase by the panel, whereby the detectors are supplied with energy. In a second phase a short circuit voltage is applied to the line, whereby all detectors of which the address memory is empty short circuit the line by means of the switch. In a third phase a measurement current is impressed onto the line, and the voltage dropping as a result at the first detector with a closed switch is determined by the voltage measurement facility and its value stored in the measured value memory. In a fourth phase an interrogation voltage is applied to the line, whereby the detector of which the measured value memory is occupied but of which the address memory is empty becomes able to communicate and is allocated an address by the panel, which it stores in the address memory.

The European patent application EP 1 174 838 A1 discloses a method and a facility for installation of peripheral devices. The method is used for installation of peripheral devices at sites with a connection to a central unit. During the installation the respective position of the installer together with the associated time information is registered, and the time of the installation of the peripheral device is stored in the central unit. The two items of time information are linked to one another and from this the site of the peripheral device at the time of the installation is obtained.

The facility for carrying out this method comprises a mobile station, which is equipped with means for determining the position of the station in each case and with means for registration of this position as a function of the time. Means are moreover provided for precisely timed notification of the installation of a peripheral device to the central unit and also means for the linkage of the installation time to the position of the station at this time.

With an installation of fire detectors addressed for a transmission of data and/or energy via the bus line, their technical identification must be assigned to the respective installation location. The technical identification includes for example a bus address of the fire detector, a serial number of the fire detector, a hardware address or the like.

Nowadays such an identification is achieved for example via the sequence of the fire detectors along the transmission line. For this it is necessary however for the cable routing, i.e. the routing of the transmission line, to be known. Another option consists of triggering a fire detector, the recording of these triggerings including the respective identification of the triggered fire detector and the subsequent assignment with the aid of specific tools. What all currently known methods have in common is that they make manual steps necessary, which are time-consuming and prone to errors. Accordingly a subsequent verification of the correctness of an identification carried out in this way is necessary. In such cases, depending on the method, a test coverage of 100% is necessary.

SUMMARY

The teachings of the present disclosure provide methods for identification of fire detectors that can run automatically. For example, some embodiments include a method for automatic identification of fire detectors (10) in a fire alarm system and in a building, wherein the fire alarm system as its devices comprises a panel (12) as well as fire detectors (10) connected via a transmission line (14) to the panel (12), wherein the fire alarm system comprises these devices (10, 12) and the transmission line (14), wherein the automatic identification is based on linear distance spacings between devices (10, 12) on the one hand and line distances between the devices (10, 12) on the other hand, wherein the linear distance spacings are available in the form of floor plan data or are determined on the basis of floor plan data as part of the method, wherein the line distances are determined by measurement along the transmission line (14) and as a result of the line distances a fire detector sequence (34) is determined, wherein by means of the linear distance spacings and the line distances a graph (40, 42) with a set of potential connection orders (44, 46) is created, wherein the fire detector sequence (34), as well as the or each potential connection order (44, 46), comprise designations, which in each case reference a fire detector (10) connected to the transmission line (14) or a fire detector provided according to the floor plan data, wherein a potential connection order (44, 46) matching the fire detector sequence (34) is determined from the set of potential connection orders (44, 46), wherein, as a result of the potential connection orders (44, 46) determined as matching, a correspondence of the designations included in the fire detector sequence (34) on the one hand and the connection order (44, 46) determined on the other hand in their order within the fire detector sequence (34) or the connection order (44, 46) determined results, and wherein this correspondence represents the identification of the fire detectors (10).

In some embodiments, for each device (10, 12) of the fire alarm system, a designation that is symbolic and used as part of the method is available, wherein spacing data records (22) are available or are created as part of the method, which comprise the symbolic designations of two devices (10, 12) of the fire alarm system in each case as well as a linear distance spacing between the respective devices (10, 12), wherein each spacing data record (22) comprises the designations of the respective devices (10, 12) as beginning and end device, wherein line distances between the devices (10, 12) of the fire alarm system along the transmission line (14) are determined by measurement and stored in the order of the measurement along the transmission line (14) as distance data records (32), wherein, as part of the method, on the basis of the spacing data records (22) and the distance data records (32) a graph (40, 42) is created, and wherein the graph (40, 42) comprises the or each potential connection order (44, 46).

In some embodiments, for creation of the graph (40, 42), in a first step a node (12) representing the panel is set up in the graph (40, 42) and is designated with the symbolic designation of the panel (12), wherein the distance data records (32) are processed one after the other according to their order, wherein matching spacing data records (22) are sought for the distance data record (32) and the designation of the last node set up in each case, wherein, for each spacing data record (22) found, a new node with the designation of the target device of the respective spacing data record (22) is set up in the graph (40) and linked to the node set up in the preceding step, and wherein the method is continued with a new step in each case with the processing of the distance data records (32) until all distance data records (32) are processed.

In some embodiments, the connection of the devices (10, 12) to the transmission line (14) defines a connection order and the fire detector sequence (34) is produced as a result of the connection order, wherein the potential connection order (44, 46) matching the fire detector sequence (34) is determined from the set of potential connection orders (44, 46), in that, in a plurality of potential connection orders (44, 46), a fire detector (10) occurring precisely once at precisely one level of the potential connection orders (44, 46) is triggered manually and a designation returned as a result of such a triggering from the triggered fire detector (10) at the position in the fire detector sequence (34) designated by the respective level in the connection order (44, 46) is sought.

In some embodiments, the determination of the line distances by measurement is undertaken in precisely one measurement direction.

In some embodiments, the determination of the line distances by measurement is undertaken starting from the panel (12), at least in sections, in a first measurement direction and, likewise starting from the panel (12), at least in sections, in a second measurement direction opposite to the first measurement direction and wherein with the measurements in the first measurement direction and the second measurement direction overall all fire detectors (10) are acquired at least once.

In some embodiments, for distance measurements along the first measurement direction, line distances between essentially a first half of the fire detectors (10) included in the fire alarm system and, for distance measurements along the second measurement direction, line distances between the remaining second half of the fire detectors (10) included in the fire alarm system are determined.

As another example, some embodiments include a computer program (50) with computer program instructions, which, when executed by a computer, cause said computer to carry out one or more of the methods as described herein.

As another example, some embodiments include a computer program product, comprising commands or electrically readable control signals, which, when executed by a computer, cause said computer to carry out one or more of the methods as described herein.

As another example, some embodiments include an apparatus with a memory and a processing unit, which is intended and configured to function as a panel (12) in a fire alarm system, wherein a computer program (50) as described herein is loaded into its memory and wherein the apparatus executes the computer program (50) when in operation.

BRIEF DESCRIPTION OF THE DRAWING

An exemplary embodiment of the teachings herein is explained in greater detail below with the aid of the drawings. Objects or elements corresponding to one another are provided with the same reference characters in all figures. In the figures:

FIG. 3 shows a first and a second database with spacing data records or distance data records;

DETAILED DESCRIPTION

Figure 1:
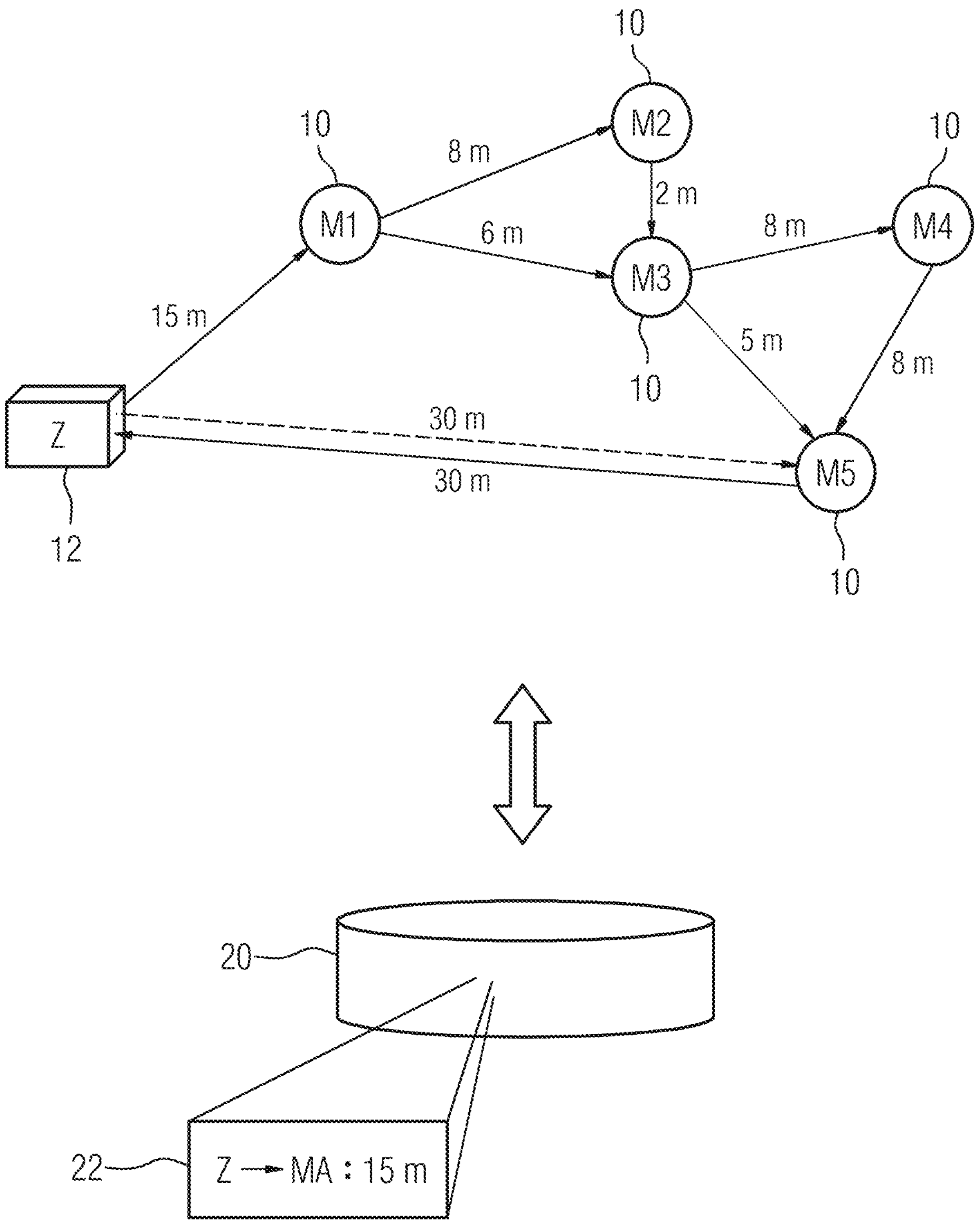
FIG. 1 shows a floor plan with fire detectors and a fire alarm panel (panel)

The methods described herein may be used for automatic identification of fire detectors in a fire alarm system in a building. The fire alarm system comprises a panel, fire detectors connected via a transmission ring line to the panel, and the transmission ring line. In example methods, the automatic identification is based on spacings (linear distance range) or in other words on linear distance between the devices on the one hand and line lengths (called distances below) or in other words distances between the devices on the other hand. The linear distance spacings are the shortest possible distances between two devices in each case. The spacings or linear distance spacings are available in the form of floor plan data or are determined on the basis of floor plan data as part of the method. The distances or line distances are determined using measurement technology along the transmission ring line.

These methods then use of two technical sources of information. The first source of information is the floor plan and the data that it comprises. The second source of information is a measurement along the transmission line carried out by the panel.

The floor plan comprises, in the form of CAD data for example, the installation locations of the fire detectors and of the panel. In new buildings in particular CAD plans of the building or of a floor or also of just one room are available almost without exception. In such plans the positions of the fire detectors and of the panel are recorded. Such data is able to be evaluated electronically and is evaluated electronically as part of the method proposed here.

In the measurement along the transmission line, the panel determines on the basis of the specific resistance of the transmission line the line resistances (resistances of the transmission line) for the individual fire detectors connected to the transmission line and from this determines on the one hand the distances between two neighboring fire detectors along the transmission line and on the other hand between the panel and the first fire detector along the transmission line as well as between the panel and the last fire detector along the transmission line. As part of this measurement the panel also establishes a sequence of fire detectors along the transmission line.

A graph is created by means of the spacings and the distances. This comprises a set of potential connection orders. This set comprises at least one potential connection order. The fire detector sequence and also the or each potential connection order comprise designations in each case. The designations of the fire detector sequence each reference a fire detector connected to the transmission line. The designations of the or of each potential connection order each reference a fire detector according to the floor plan data. From the set of potential connection orders, as part of the method, a potential connection order matching the fire detector sequence is determined. By virtue of the potential connection order determined as matching, the result of the method is a correspondence of the designations included in the fire detector sequence on one hand and the connection order determined on the other hand, and indeed in their order within the fire detector sequence or the connection order determined. The correspondence determined represents the identification of the fire detectors aimed for with the method.

For intellectual testing of whether the correspondence determined can be the identification of the fire detectors aimed for, the following must be borne in mind: The connection order determined comprises the designations of the fire detectors in the spacing data records, i.e. the designations of the fire detectors in the first database. The first database is the floor plan data or the first database is based on the floor plan data. The connection order determined thus comprises the designations of the fire detectors in the floor plan data. The fire detector sequence comprises the designations of the fire detectors in the distance data records. The designations in said record are for example the bus addresses of the fire detectors or the like. The correspondence of the fire detector sequence found and the connection order determined thus makes possible a unique assignment of the fire detector provided according to the floor plan to the fire detectors connected to the transmission line and vice versa. This represents the identification of the fire detectors aimed for. Each fire detector connected to the transmission line is uniquely identified as precisely one of the fire detectors provided according to the floor plan (and vice versa).

With the assignment of a symbolic designation used in the floor plan in each case to each fire detector a unique reference between the real fire detectors and the floor plan data is defined. This reference also enables further floor plan data to be accessed via the symbolic designation originating from the floor plan data.

To be carried out automatically, the method may be executed by a computer program. The computer program is an implementation of the physical method for automatic identification of fire detectors. Various embodiments are then on the one hand also a computer program with program code instructions able to be executed by a computer and on the other hand a memory medium with such a computer program, i.e. a computer program product with program code means, and also ultimately also an apparatus, into the memory of which such a computer program is loaded or is able to be loaded as a means for carrying out the method and its embodiments.

When method steps or series of method step are described below, this relates to actions that are undertaken as a result of the computer program or under the control of the computer program, provided it is not expressly pointed out that individual actions are brought about by a user of the computer program. Each use of the term "automatically" at least means that the action concerned takes place as a result of the computer program or under the control of the computer program.

Instead of a computer program with individual program code instructions the method described here and below can also be implemented in the form of firmware. It is clear to the person skilled in the art that, instead of an implementation of a method in software, an implementation in firmware or in firmware and software or in firmware and hardware is also possible. Therefore what should apply for the description given here is that the term software or the term computer program also comprises other implementation options, namely in particular an implementation in firmware or in firmware and software or in firmware and hardware.

Some embodiments include an apparatus intended and configured for carrying out one or more of the methods described herein. In the case of an external apparatus connected either permanently of merely temporarily to the fire alarm system as a means for carrying out the method, the method comprises the additional method steps of a transfer of the data determined as part of the method by the panel to these apparatuses for further processing. Examples of such apparatuses are a so-called edge device or at least a device or a group of devices in what is known as the Cloud.

The respective apparatus, in particular the panel, for carrying out the methods comprises a processing unit in the form of or as a type of microprocessor as well as a memory, in which an implementation of the method in software is stored or an implementation in software and firmware is stored or embedded. During operation of the panel this carries out the method, for example during a first commissioning of a fire alarm system comprising the panel. For this the floor plan data is made available to the panel, for example by the panel being able to access a memory with this data, at least temporarily via a network connection (Ethernet or the like).

For the further description, to avoid unnecessary repetitions, features and details that are described in conjunction with the said method for automatic identification of fire detectors as well as any possible embodiments naturally also apply in conjunction with and with respect to the apparatus configured for carrying out the method, i.e. in particular a panel of a fire alarm system, and vice versa. Accordingly the method can also be developed by means of the individual or number of method features, which relate to the method steps carried out by a corresponding apparatus, and also the apparatus can be developed by means for carrying out method steps carried out as part of the method. Consequently features and details that are described in conjunction with the physical method naturally also apply in conjunction with and with respect to the apparatus intended for carrying out the method and vice versa in each case, so that mutual reference is always made or can be made with regard to the disclosure for the individual aspects of the teachings herein.

References used within the claims in such cases point to the further embodiment of the subject matter of the claim taken into account by the features of the respective claim in each case. They are not to be understood as dispensing with achieving an independent, physical protection for the features or combinations of features of a dependent claim. Furthermore, in respect of an interpretation of the claims as well as the description for a more detailed concretization of a feature in a dependent claim, it is assumed that such a restriction in the respective preceding claims and also a more general form of embodiment of the physical method is not present. Each reference in the description to aspects of dependent claims is thus to be read, even without being specifically pointed out, expressly as a description of optional features.

In some embodiments, for each device of the fire alarm system, a designation that is symbolic and is used as part of the method is present, that spacing data records are present or are created as part of the method, which comprise the symbolic designations of two devices of the fire alarm system in each case as well as a spacing between the respective devices, that each spacing data record comprises the designations of the respective devices as start and end device, that distances along the transmission line between the devices of the fire alarm system are determined by measurement technology and are stored in the order of the measurement along the transmission line as distance data records, that, as part of the method, on the basis of the spacing data records and the distance data records, a graph is created and that the created graph comprises the or each potential connection order, namely the or a potential connection order that is investigated as part of the method with regard to the fire detector sequence. The symbolic designations of the fire detectors given above originate for example from the floor plan data and are in such a case already set there as symbolic designations of the fire detectors. Reference is made to the designations of the respective devices in a spacing data record as start and end device (each spacing data record comprises the designations of the respective devices as start and end device).

In some embodiments, the spacing data records encode the above-mentioned spacings between the devices and the distance data records the likewise above-mentioned distances between the devices. The spacing data records and the distance data records are the first or second source of information.

In some embodiments, the graph created as part of the method is created in a number of steps. In a first step a node representing the panel is set up in a graph and designated with the symbolic designation of the panel. Subsequently the distance data records are processed one after the other in accordance with their order. In this case, for the distance data record considered in each case and the designation of the last node set up, matching spacing data records are sought. For each spacing data record found a new node with the designation of the target device of the respective spacing data record is set up in the graph and connected to the node set up in the preceding step. The method is then continued in each case with a new step with the processing of the distance data records, until all distance data records are processed.

This method is an example of a creation of a graph, which comprises at least one path between a first node representing the panel and a last node, likewise representing the panel. Each node has been assigned a symbolic designation as part of the method and from the sequence of the nodes of this path a sequence of symbolic designations is produced. Such a path is produced as a result of a corresponding subtree of the graph. To this extent the terms path and subtree are synonymous: each subtree of the graph describes/defines a path in the graph; each path in the graph is based on a subtree of the graph. All symbolic designations except the first symbolic designation (designates the panel) and the last symbolic designation (likewise designates the panel) occurring along the path are taken into consideration. This is a series of symbolic designations and this series (each such series) is a potential connection order.

In some embodiments, the determination of the distance by measurement is undertaken either in precisely one measurement direction or according to a specific method, which is implemented for example as a sub-method within the method proposed here. In this sub-method the distances are determined by measurement starting from the panel, at least in sections, in a first measurement direction and subsequently, likewise starting from the panel, at least in sections, in a second measurement direction opposite to the first measurement direction (distance measurement in both measurement directions), wherein with the measurements in the first measurement direction and the second measurement direction overall, all fire detectors are acquired at least once. This submethod of the distance measurement in both measurement directions comes into consideration as a basis for a later execution of the method, in particular a test or identification method, and is independent thereof in the sense that carrying out a method executing later for the submethod of distance measurement in both measurement directions is not necessary. This submethod of distance measurement in both measurement directions comes into consideration as a basis for the previously described method and its embodiments and is independent thereof in the sense that a later execution of the method previously described and any possible embodiments is not necessary for the submethod of distance measurement in both measurement directions.

The distance measurement in both measurement directions can be undertaken fully independently of any form of a use occurring later of the measured values (measured distance values) obtained during this distance measurement. A separate claiming of the distance measurement in both measurement directions without the inclusion of the features of the method proposed here for automatic identification of fire detectors remains expressly reserved and for the further description it is true to say that for the explanation of the distance measurement in both measurement directions its independence from the method for automatic identification of fire detectors is always and exclusively to be read at the same time.

The method for measurement in two directions in a form independent of a later execution of test or identification methods can be briefly defined as follows: a method for carrying out measurements in a fire alarm system and in a building, wherein the fire alarm system comprises as its devices a panel and also a fire detector connected to the panel via a transmission line, wherein the fire alarm system comprises these devices and the transmission line, wherein a determination by measurement of distances in the fire alarm system is undertaken starting from the panel, at least in sections, in a first measurement direction and, likewise starting from the panel, at least in sections, in a second measurement direction opposite to the first measurement direction and wherein, with the measurements in the first measurement direction and the second measurement direction, overall all fire detectors are acquired at least once.

In some embodiments, the identification of the fire detectors can run automatically or at least essentially automatically and thus the previously unavoidable sources of errors are removed. A further advantage lies in the fact that for example, where an exchange of a fire detector is necessary of which the position in the building/on the floor of the building/in the room is known precisely, namely from the floor plan data, on the basis of the method proposed here a precise assignment (identification) of the physical fire detector with network address (bus address) and/or serial number or the like to the floor plan data is provided.

The exemplary embodiment described herein is not a restriction of the teachings of the disclosure. Instead, within the framework of the present disclosure expansions and modifications are also entirely possible, in particular those that for example through combination or variation of individual features or method steps described in conjunction with the general or specific part of the description and also contained in the claims and/or the drawing, are able to be extracted for the person skilled in the art in respect of the achievement of the object and lead through combinable features to a new object or to new method steps or series of method steps.

The diagram in FIG. 1 shows a simple floor plan—i.e. a basic outline or a plan of the floors of a building not shown in any greater detail—with fire detectors 10 and a panel controlling and monitoring the fire detectors 10 (fire alarm panel, central unit) 12. Regularly fire detectors 10 possess distinguishing features able to be recognized from the panel 12 and marked in the floor plan, which can be employed for identification. For example, the types of the detectors—manual fire detector, heat alarm, optical smoke alarm, combined alarm, input and output components—can be distinguished.

Figure 2:
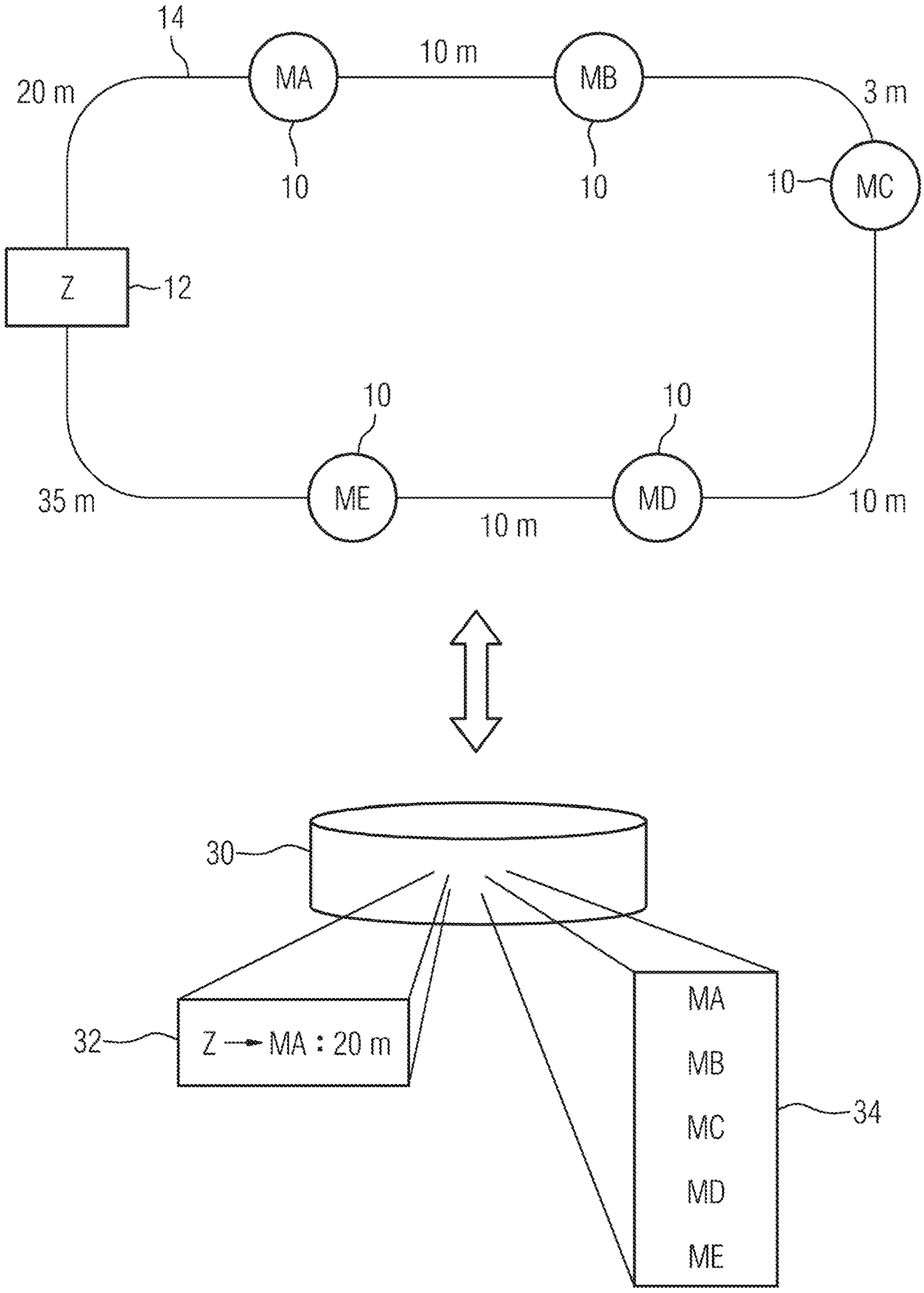
FIG. 2 shows a fire alarm system with a panel, a transmission line connected to the panel and fire detectors connected to the transmission line and thus also to the panel.

The fire detectors 10 are connected to the panel 12 by means of a transmission ring line, sometimes referred to below for short as a transmission line 14 (FIG. 2). Each fire detector 10 is assigned a symbolic designation basically freely selectable in the floor plan but unique within the floor plan. In the diagram in FIG. 1 the fire detectors 10 are symbolically designated "M1", "M2" etc. and the panel 12 is symbolically designated "Z".

The number of the fire detectors 10 is selected for the description given here and in the interests of an easy-to-understand diagram the floor plan shown comprises just a few fire detectors 10. In practice a much greater number of fire detectors 10 is usual. The approach proposed here is equally suitable for many fire detectors 10, for example twenty, thirty and more fire detectors 10, but also for fewer fire detectors 10, for example five or ten fire detectors 10.

The floor plan data is available in a computer-readable form (for example in the form of CAD data) and a corresponding file or the like with the floor plan data is referred to below as the database 20 and, to distinguish it from a further database to be explained later (FIG. 2), as the first database 20.

The first database 20 comprises the positions (installation locations) of the panel 12 and of each fire detector 10 connected to the panel 12 by means of the transmission line 14. The first database 20 comprises these positions for example directly, in particular in the form of CAD data, or the positions are produced from the data included in the first database 20. The spacings between the panel 12 and at least individual fire detectors 10 and also between at least individual fire detectors 10, in particular between the panel 12 and each fire detector 10 and also between all fire detectors 10 are produced from the respective positions. Individual spacings are marked in the diagram in FIG. 1 for example, e.g. "15 m", "8 m" etc.

The spacings are the lengths in each case of a line between two fire detectors 10 or between the panel 12 and a fire detector 10. The spacing between fire detectors 10 designated by the symbols "M1" and "M2" amounts in the example shown to "8 m", i.e. eight meters, and the spacing between the panel 12 and the fire detector 10 designated by the symbol "M1" amounts in the example shown to "15 m", i.e. fifteen meters.

In the situation shown by way of example in FIG. 1 the spacings produced are as follows:

Z→M1: 15 m,
Z→M5: 30 m,
M1→M2: 8 m,
M1→M3: 6 m,
M2→M3: 2 m,
M3→M4: 8 m,
M3→M5: 5 m,
M4→M5: 8 m and
M5→Z: 30 m.

It should be pointed out that not all possible spacings are marked and listed. Basically the method proposed here can take account of all possible spacings, for example all spacings from the panel 12 to each fire detector 10 and/or all spacings from one fire detector 10 to every other fire detector 10 in each case. For simplification only individual spacings are shown and listed above.

A restriction of the amount of spacings to be considered can be produced in an automatically evaluable form from the floor plan data, for example when there is a building wall between the panel 12 and individual fire detectors 10 or between a fire detector 10 and other fire detectors 10. A restriction of the amount of spacings to be considered can moreover be produced in an automatically evaluable form on the basis of different types of fire detectors 10 and/or possible branches.

The spacings produce together with those devices (panel 12 or fire detector 10), between which the respective spacings exist, a data record referred to below as the spacing data record 22. In this case it is not a matter of whether such data records 22 are held in their own data structure or whether such data records 22 arise only temporarily on the basis of the data of the first database 20. For ease of reference these are still called spacing data records 22 below and the rows given above can accordingly be seen as examples for such spacing data records and their contents. An individual spacing data record 22 is shown symbolically in FIG. 1.

Each spacing data record 22 comprises the spacing determined in each case and designations of such devices (panel 12 or fire detector 10), between which the respective spacing exists. The respective devices are generally called "start device" and "end device" and with these terms the content of a spacing data record 22 can be generally written as follows:

Start device→end device: spacing.

Each spacing data record 22 thus comprises spacing data, namely the respective spacing, and designation data, namely the designations of the respective start and end device. The first database 20 comprises (directly or indirectly) the spacing data records 22. Thus the first database 20 also comprises this spacing and designation data.

The diagram in FIG. 2 shows a fire alarm system and the panel 12 and the fire detectors 10 in accordance with FIG. 1 as devices included in the fire alarm system. Shown in the diagram in FIG. 2 is the transmission line, to which the panel 12 and each individual fire detector 10 are connected and which joins the fire detectors 10 to the panel 12. The fire detectors 10 are connected to the transmission line 14 and connected by means of the transmission line 14 to the panel 12. The transmission line 14 is a component of the fire alarm system.

The transmission line 14 is shown as a pure ring line, i.e. with any basically possible branch line branching from the transmission line 14. The description given below is given, in the interest of making things simple, using a transmission line 14 in the form of a pure ring line. The innovation proposed here is expressly not restricted to a transmission line 14 in the form of a pure ring line and any mention of the transmission line 14 or of a transmission ring line can always be read as a transmission line 14 in the form of a pure ring line and a transmission line 14 in the form of a ring line with at least one branch line branching from the ring line.

Along the transmission line 14 the panel 12 (as starting or initial point of the transmission line 14) is followed by a fire detector 10, this is followed by a further fire detector 10 etc., until the transmission line 14 finally ends at the panel 12 (as end point of the transmission line 14). With a transmission ring line with branches—not shown here—at least one fire detector 10 is connected to a branch line in each case.

The connection of the fire detectors 10 to the panel 12 exists for exchange of data via the transmission line 14. The exchange of data is undertaken at least between the panel 12 and each fire detector 10. Optionally the connection of the fire detectors 10 to the panel 12 exists for such an exchange of data and in addition for supply of energy of each fire detector 10 by the panel 12 and also via the transmission line 14. The exchange of data or the exchange of data and also the transmission of energy is or are undertaken for example on the basis of a data transmission or data and energy transmission protocol basically known per se. The protocol used by the applicant in this regard is known by the name FDNet.

The panel 12 and the fire detector 10 are also designated in the diagram in FIG. 2. The designations are basically freely selectable, but have to be unique along the transmission line 14. In some embodiments, designations are used here that originate from the fire detectors 10 themselves and are able to be read out for the panel 12 at each fire detector 10. Unique designations, which come into consideration in this regard, are for example a bus address of the fire detector 10, a serial number or the like (see above: "technical identification"). The description that follows is continued on the basis of the, especially short and simple, symbolic designations shown in FIG. 2. In this regard these designations can be seen for example as (simplified) bus addresses of the individual fire detectors 10. Likewise these designations can be seen for example as symbolic designations and also as (simplified) bus addresses of the individual fire detectors 10.

It should be pointed out here that, at the beginning of the example methods described here, no information regarding an assignment of the fire detectors 10 connected to the transmission line 14 for an installation location provided in accordance with the floor plan is present in the respective fire alarm system (panel 12, fire detectors 10 and transmission line 14). Above all no assignment between a designation of the fire detectors 10 along the transmission line 14 and a symbolic designation of the fire detectors 10 exists in the floor plan. The fire detectors 10 accordingly, and also to distinguish them better within the framework of the further description of the method proposed here, are provided with different designations in the diagram in FIG. 2 by comparison with the diagram in FIG. 1. In the diagram in FIG. 1 the fire detectors are designated symbolically with "M1", "M2", "M3", etc. In the diagram in FIG. 2 the fire detectors are designated with "MA", "MB", "MC", etc.

At the beginning of the method proposed here no knowledge exists about whether or not for example the fire detector 10 connected to the transmission line 14 and designated with "MA" is the fire detector 10 provided according to the floor plan and designated symbolically there with "M1". The information as to which fire detector 10 on the transmission line 14 a specific fire detector 10 in the floor plan corresponds—i.e. the identification of the fire detectors 10-, is the object of the method proposed here.

By means of measurements, in particular resistance measurements during sequential switching-on ("connection") of the fire detectors 10 to the transmission line 14, along the transmission line 14 ranges referred to below as distances for distinction purposes are determined between the devices (panel 12 and fire detectors 10) connected to the transmission line 14.

In some embodiments, the measurement is carried out for example as a directed measurement, in this case the distance is explicitly measured in a basically freely selectable circumferential direction, but one retained during the course of the method, along the transmission line 14. The circumferential direction selected in each case is the measurement direction. In a preferred form of embodiment of the approach proposed here the measurements are made starting from the panel 12 and then successively up to each fire detector 10 reached within the scope of the measurements.

In general the following distances are determined: The distance between the panel 12 and the first fire detector 10 along the transmission line 14—i.e. in the situation shown in FIG. 2, between the panel 12 and the fire detector 10 designated symbolically with "MA"-, the distance between two fire detectors 10 directly following one another (neighboring) along the transmission line 14 and also the distance between last fire detector 10 along the transmission line 14 and the panel 12—i.e. in the situation shown in FIG. 2, between the fire detector 10 designated symbolically with "ME" and the panel 12. The determination of the distances between two neighboring fire detectors 10 along the transmission line 14, in the situation shown in FIG. 2, comprises the distances between the fire detectors 10 symbolically designated with "MA" and "MB", between the fire detectors 10 symbolically designated with "MB" and "MC" etc.

In the situation shown by way of example in FIG. 2 the distances are as follows:

Z→MA: 20 m,
MA→MB: 10 m,
MB→MC: 3 m,
MC→MD: 10 m,
MD→ME: 10 m and
ME→Z: 35 m.

The distances determined by measurement (FIG. 2) are regularly greater than the spacings in accordance with the floor plan (FIG. 1) and the linear distance range in said plan, since the line routing of the transmission line 14 usually follows the circumstances in the respective building (walls, ceilings etc.).

In some embodiments, the distances determined are stored in a computer-readable form in a second database 30. In this case individual data records are produced in the second database 30, which, for distinction purposes, are referred to as distance data records 32. A number N of the distance data records 32 determined corresponds to the number of individual sections of the transmission line 14 between two devices in each case (panel 12 or fire detector 10) of the fire detector system and also the number of devices included in the fire detector system as a whole. The number of fire detectors 10 included in the fire detector system is thus given as N−1.

In some embodiments, the distance data records 32 are numbered during the course of their determination, so that each distance data record 32 comprises an index:

(1) Z→MA: 20 m, (2) MA→MB: 10 m, (3) MB→MC: 3 m, etc. MC→MD: 10 m, etc. MD→ME: 10 m and (N) ME→Z: 35 m.

With the index resulting from this numbering, access to each individual distance data record 32 is possible.

In some embodiments, the distances are initially measured in a first measurement direction and subsequently are measured again, but in a second measurement direction, opposite to the first measurement direction. In the distance measurement in the first measurement direction the distance data records 32 are produced as described above including a numbering as well as a determination of the number N of devices included overall in the fire detector system.

Because each of the fire detectors 10 possesses a volume resistance, which is subject to certain tolerances, the measurement is more precise the fewer fire detectors 10 lie in the measurement path. I.e. for an especially precise determination of a specific distance, that measured value is advantageous for which the smaller number of fire detectors 10 lie on the part of the transmission line 14 involved in the measurement. With a measurement only in precisely one measurement direction it must therefore be assumed that the measured values of distances become more imprecise with an increasing number of fire detectors 10 along the measurement path. With a measurement in both possible measurement directions (first measurement direction, second measurement direction) it is precisely this increasing imprecision that can at least partly be compensated for.

In some embodiments, the distances determined in the second measurement direction may be to a certain extent entered backwards into the series of distance data records 32. The first distance determined in the second measurement direction is thus entered into the distance data record 32 with the index N as the distance. The second distance determined in the second measurement direction is entered into the distance data record 32 with the Index N−1 as the distance and so forth. This is continued at least until the (N/2) distance data record 32 in the second measurement direction—of course only the next larger or next smaller whole number value resulting after the division are used. The result is a sequence of distance data records 32 in which the distances for around half of the fire detectors 10 have been determined in the first measurement direction and the remaining other half of the fire detectors 10 have been determined in the second measurement direction. Through this the increasing imprecision outlined above of the distance measurement in the case of a large number of fire detectors 10 in a measurement path is avoided as far as possible.

As part of the measurement of the distances along the transmission line 14 (distance measurement) in precisely one measurement direction, in particular by means of the distance measurement or with sequential connection of the fire detectors 10 to the transmission line 14, information on the order of the fire detectors 10 along the transmission line 14 is also determined. This information is referred to below as the fire detector sequence 34. In the diagram in FIG. 2 the fire detector sequence 34 is shown as a self-contained data record included in the second database 30. A self-contained data record is not necessary and accordingly just one option. The fire detector sequence 34 is likewise produced by a consideration of all distance data records 32 in the correct order corresponding to the distance measurement in precisely one measurement direction.

The diagram in FIG. 3 shows the first database 20 with the spacing data records 22 included in it and also the second database 30 with the distance data records 32 once again included in it (each corresponding to the situation shown by way of example in FIG. 1 and FIG. 2). The first column or the second column—each without any possible index—of the totality of the distance data records 32 without the designation of the panel 12 evidently corresponds to the fire detector sequence 34, so that these can be taken without any specific acquisition directly from the totality of the distance data records 32.

Note: For better understanding of the description presented here it should be pointed out that the terms spacing and distance used have been selected with care. Both terms refer to ranges. The term spacing relates to the data, which relates back directly or indirectly to the floor plan. The term distance relates to the data, which relates back directly or indirectly to measurements along the transmission line 14. Spacings (spacing information) is produced in computer-readable and automatically processable form from the first database 20 and the spacing data records 22. Distances (distance information) is produced—after preceding corresponding measurements—likewise in computer-readable and automatically processable form from the second database 30 and the distance data records 32.

The spacing information from the first database 20 to a certain extent represents "linear distance ranges". The distance information from the second database 30 represents ranges along the transmission line 14.

Each distance data record 32 comprises at least the distance determined. In some embodiments, each distance data record 32 additionally comprises that device from which the distance measurement has been made ("start device") and/or that device, to which the distance has been determined ("end device"). The above rows can thus be seen as examples for distance data records 32 with the structure "start device, end device, distance" (or the optional structure "index, start device, end device, distance") and their contents. In the diagram in FIG. 2 an individual distance data record 32 is shown symbolically. In general and with the terms introduced above, the content of a distance data record 32 can be written as follows:

start device→end device: distance, wherein the specification of the start and/or end device are basically optional data.

In some embodiments, first of all distances along the transmission line 14 are determined and stored in the second database 30 by means of the respective distance data records 32. In some embodiments, the distances are each determined as required, for example only an individual distance in each case. Then the second database 30 comprises only a distance data record 32 in each case for the or each newly determined distance in each case or a distance data record 32 for the or each newly determined distance in each case as well as the distance data records 32 of all distances determined beforehand.

In the interest of improved readability of the description given below it is assumed that the second database 30 is present in a form in which it comprises one distance data record 32 in each case for all distances measured along the transmission line 14 and that the distance data records 32 in the second database 30 are present in the form of a table, a list or the like, so that the individual distance data records 32 can be accessed one after another and according to the order of the distances measured along the transmission line 14 in each case. The distance data record 32 with the distance from the panel 12 to the first fire detector 10 is thus the first distance data record 32, the distance data record 32 with the distance from the first fire detector 10 to the next fire detector 10 is the second distance data record 32 etc. From this order on the one hand and the distance data records 32 on the other hand the fire detector sequence 34 can thus also be implicitly produced. For the person skilled in the art it is clear that other forms of storage of the distance data records 32 come into consideration, which likewise allow access in the order of the distances measured along the transmission line 14 in each case, for example access by means of a lookup table, wherein the lookup table for example comprises the addresses of the distance data records 32 in ordered form.

Figure 4:
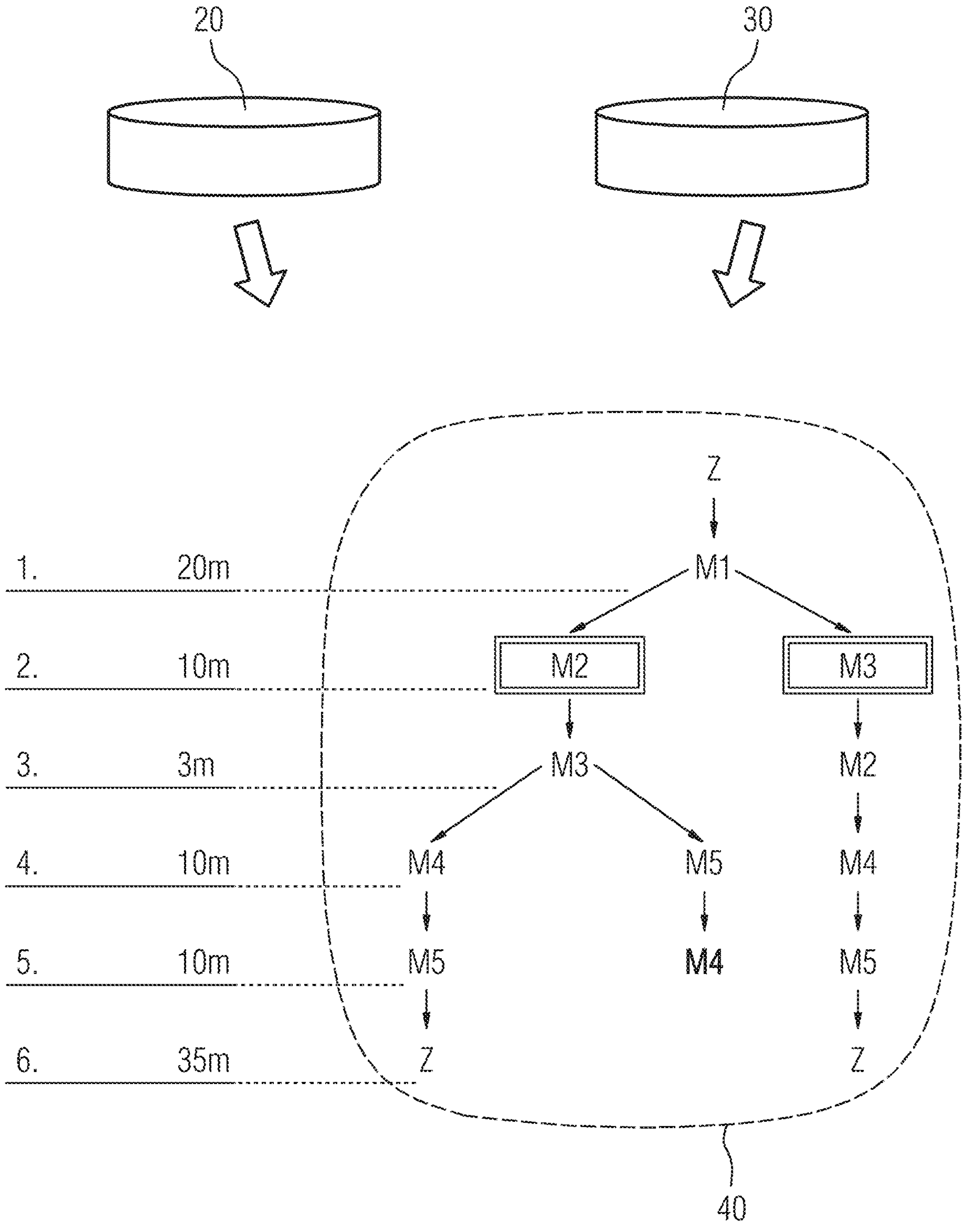
FIG. 4 shows a graph resulting from an example method incorporating teachings of the present disclosure based on the spacing and distance data records.

The diagram in FIG. 4 shows a graph 40. According to the approach proposed here for identification of the fire detectors 10 and as part of the method proposed here, such a graph 40 is generated automatically. The root of the graph 40 represents the panel 12. Nodes in the graph 40 represent the fire detectors 10 connected by means of the transmission line 14 to the panel 12. The graph 40 shown by way of example in FIG. 4 is a graph 40 for the floor plan in accordance with FIG. 1 as well as for the fire alarm system in accordance with FIG. 2 and the fire detectors 10 in said system.

At the beginning of the method a node representing the panel 12 is set up in the graph 40. This node is given a symbolic designation, namely the symbolic designation of the panel 12 also able to be used as part of the method, i.e. the symbolic designation "z". This node forms the root of the graph 40.

Now, for the automatic generation of the graph 40, starting from the panel 12, the distances determined along the transmission line 14 are considered. For this the second database 30 with its distance data records 32 is processed in the order of the distances determined.

The generation of the graph 40 thus begins with the first distance data record 32

Z→MA 20 m and the distance ("20 m"; twenty meters) specified there; it should be pointed out that the information about the start device ("Z") and about the end device ("MA") in the distance data record 32 is optional information. In the diagram in FIG. 4 this is designated at the side with "1." for a first search in the spacing data records 22 and the distance "20 m" considered is likewise specified for this search.

Now spacing data records 22 in the first database 20 matching the distance from the distance data record 32 and also the symbolic designation of the node just set up—i.e. with the distance "20 m" or the designation "Z"—are searched for. Matching spacing data records 22 in this case are such spacing data records 22 as have the designation "Z" as the designation of the start device and for which the spacing specified there is less than or equal to "20 m". A spacing data record 22 established in such a search and subsequently processed is subsequently deleted or at least marked so that it is now found once again in a later search.

In general the searches in the first database 20 and the spacing data records 22 there can be written as follows: Those spacing data records 22 are determined that, as the designation of the start device, have a designation that corresponds to the designation of the node just set up in the graph 40, and for which the spacing specified there is less than or equal to the distance specified in the distance data record 32 considered.

From the spacing data records 22 specified above, in this first search (designated in the diagram in FIG. 4 to the side with "1." and the distance "20 m" considered for this search) the following data record (spacing data record 22) is determined as matching:

Z→M1: 15 m.

Only this spacing data record 22 has the designation "Z" as the designation of the start device and a spacing less than or equal to "20 m".

On the basis of this spacing data record 22 determined in this first search (basically on the basis of each spacing data record 22 determined in this first search) a node is set up in the graph 40 for the end device specified there in each case. The or each new node is given the symbolic designation of the end device of the respective spacing data record 22, i.e. "M1" here. The or each new node is linked to the node representing the panel 12 by means of an edge in the graph 40.

Below—once more in the interest of improved readability of the further description—sometimes the nodes of the graph 40 are designated with the symbolic designations of the device represented in each case (fire detector 10 or panel 12). The node representing the fire detector 10 with the symbolic designation "M1" is thus designated in accordance with this convention as "node M1". The same applies accordingly for all further nodes as well as for the nodes representing the panel 12.

The search is now continued with the second distance data record 32

MA→MB 10 m, of the distance ("10 m"; ten meters) specified there and with the symbolic designation of the node M1 ("M1") just set up; designated in the diagram in FIG. 4 to the side with "2." and with the distance "10 m" considered in this search (for the further searches described below this applies correspondingly). In this—as already basically described above—now those spacing data records 22 are determined, which have as the designation of the start device a designation that corresponds to the designation of the node M1 just set up—i.e. "M1"—and for which the spacing specified there is less than or equal to the distance specified in the distance data record 32 considered—i.e. "10 m".

From the spacing data records 22 specified above, in this second search, the following data records (spacing data records 22) are determined as matching:

M1→M2: 8 m and

M1→M3: 6 m.

Only these two spacing data records 22 have the designation "M1" as the designation of the start device and a spacing of less than or equal to "10 m".

On the basis of each (of the or of each) spacing data record 22 determined in this second search a node in the graph 40 is set up for the end device specified there in each case, namely a node with the symbolic designation of the end device of the respective spacing data record 22, i.e. "M2" and "M3" here. Each new node—here the new nodes M2 and M3—is linked to the node created in the preceding step in each case—i.e. here the node M1—by means of an edge in the graph 40.

For more than one new node created as a result of a search with a distance data record 32 in the graph 40, each newly created node spans a subtree in the graph 40. Below the further method is further explained with the aid of the node representing the fire detector 10 with the symbolic designation "M2" (and itself designated with "M2") and of the subtree emanating from there.

Each subtree in the graph 40—also further subtrees arising as part of the method—is handled in precisely the same way as this subtree.

Now the search is continued with the third distance data record 32

MB→MC 3 m, of the distance ("3 m"; three meters) specified there and with the symbolic designation of the node M2 ("M2") just set up.

Once again, as already described above, those spacing data records 22 are determined that have as the designation of the start device, a designation that corresponds to the designation of the node M2 just set up—i.e. "M2"—and for which the spacing specified there is less than or equal to the distance—i.e. "3 m" specified in the distance data record 32 considered.

In this search, from the spacing data records 22 specified above, the following data record (spacing data record 22) is determined as matching:

M2→M3: 2 m.

Only this spacing data record 22 has the designation "M2" as its designation of the start device and a spacing of less than or equal to "3 m".

On the basis of the (the or each) spacing data record 22 determined in this third search, for the (the or each) end device specified there in each case, a node—node M3—is set up in the graph 40. The (the or each) new node M3 is linked to the node created in the respective preceding step—i.e. here the node M2—by means of an edge in the graph 40.

Now the search is continued with the next (the third) distance data record 32

MC→MD 10 m, of the distance ("10 m"; ten meters) specified there and with the symbolic designation of the node M3 ("M3") just set up.

Once again, as already described above, those spacing data records 22 in the remaining spacing data records 22 are determined that have as the designation of the start device a designation that corresponds to the designation of the node M3 just set up—i.e. "M3"—and for which the spacing specified there is less than or equal to the distance specified in the distance data record 32 considered—i.e. "10 m".

In this search, from the remaining spacing data records 22, the following data records are determined as matching:

M3→M4: 8 m and

M3→M5: 5 m.

Only these two spacing data records 22 have the designation "M3" as the designation of the start device and a spacing of less than or equal to "10 m".

On the basis of each (the or each) spacing data record 22 determined in this search, for each (the or each) end device specified there in each case, a node—node M4, node M5—is set up in the graph 40. Each (the or each) new node—i.e., here M4, M5, is linked to the node created in the respective preceding step—i.e. here the node M3—by means of an edge in the graph 40.

Again the starting points of new subtrees arise here with the nodes M4, M5 and the further description is only continued along the subtree emanating from the node M4. The other subtree—as has already been described before—as part of the method later or with a suitable processing hardware and software is if necessary also handled and continued in precisely the same way at the same time or approximately at the same time.

The search is now continued with the next (the fourth) distance data record 32

MD→ME 10 m, of the distance ("10 m"; ten meters) specified there and with the symbolic designation of the node M4 ("M4") just set up. In this case those spacing data records 22 are determined from the spacing data records 22 still remaining that have as the designation of the start device the designation of the node M$ just set up—i.e. "M4"—and for which the spacing specified there is less than or equal to the distance—i.e. "10 m" specified the distance data record 32 considered.

The sole matching spacing data record 22 is the data record (spacing data record 22)

M4→M5 8 m and on this basis the node M5 is set up in the graph 40 and linked by means of an edge to the previously created node M5.

In this way the search is continued until it is either no longer possible to find a matching spacing data record 22 or the last distance data record 32 has finally been taken into consideration. In the present example this is the case with the last distance data record 32 (ME→Z: 35 m) and the spacing data record 22 (M5→Z: 30 m) found for it and a node representing the panel Z arises in the graph 40 as a leaf of the graph 40.

The result of the search and the nodes and edges created in each case (illustrated by arrows pointing from one node to a following node) are shown for the situation taken as an example in the diagram in FIG. 4.

Only the subtrees in the resulting graph 40 that emanate from the panel Z and end at the panel Z come into consideration for the identification of the fire detectors 10. When the graph 40 only comprises one such subtree, the identification is already uniquely possible. Then, with aid of the designations of the nodes of the subtree (Z, M1, M2, M3, M4, M5, Z), the identification of the real fire detectors 10 connected to the transmission line 14 can take place. These fire detectors 10 have been symbolically designated with MA, MB, MC, MD and ME and the order of the identifiers also corresponds to the order along the transmission line. With the aid of the identifiers of the nodes given above and their order, the result is that the following correspondences apply: MA=M1, MB=M2, MC=M3, MD=M4 and ME=M5. This means that the fire detector 10, temporarily or symbolically designated with "MA", corresponds to the fire detector 10 symbolically designated in the floor plan with "M1" etc. All or selected or selectable data of the fire detector 10 connected to the transmission line 14 can now be transferred appropriately into the floor plan data, for example a serial number of the fire detector 10, a bus address of the fire detector 10, etc. Optionally, in precisely the same way, selected or selectable data set up in the floor plan for this fire detector 10 can also be transmitted to the real fire detector 10 connected to the transmission line 14 and embedded there in a memory of the fire detector 10.

If, after the conclusion of the described method, more than one possible solution is produced (FIG. 4: Z, M1, M2, M3, M4, M5, Z; Z, M1, M3, M2, M4, M5, Z), thus, in the graph 40, an ambiguity in the form of more than one path beginning at the panel Z and ending at the panel Z—as is the case above all with symmetrical topologies-, the actually correct solution, namely the actual subtree to be considered, is determined by exclusion.

Figure 5:
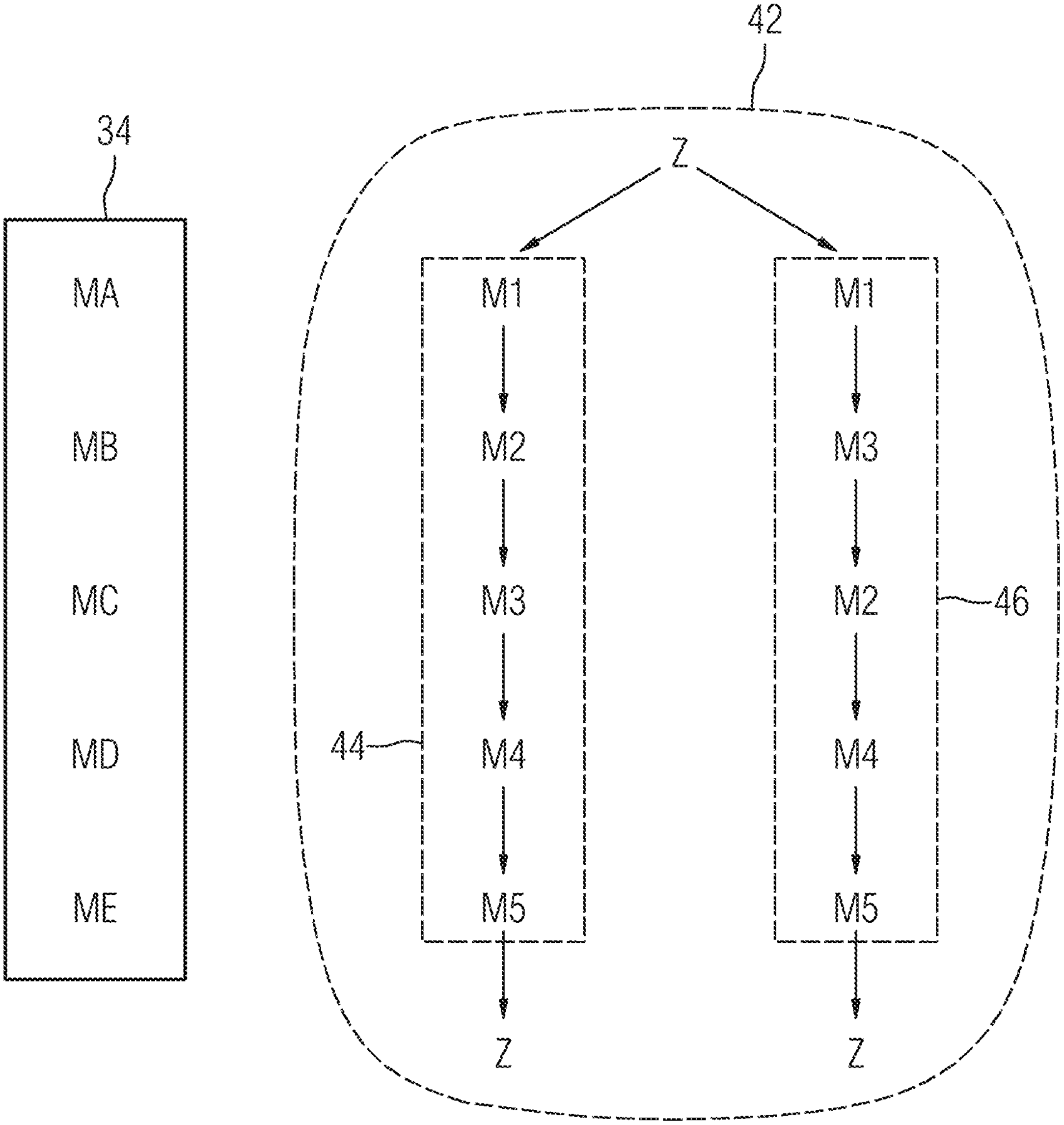
FIG. 5 shows a reduced graph and potential connection orders resulting therefrom as well as a sequence of fire detectors.

To this end at least one fire detector 10 is determined of which the unique identification can give rise to an ambiguity. For this a reduced graph 42 is optionally created from the graph 40. The reduced graph 42 arises by all subtrees, that do not begin at the panel Z and end at the panel Z, being removed in the original graph 40. The diagram in FIG. 5 shows the reduced graph 42 resulting in this regard on the basis of the graph 40 in FIG. 4. Thus, in the reduced graph 42, only those subtrees (paths) remain that describe possible solutions to the problems. The method can also be continued with the original graph 40, namely by exclusively considering the complete paths there (beginning at the panel Z and ending at the panel Z). The original graph 40 comprises the reduced graph 42. Thus the original graph 40 also comprises all data described below with regard to the reduced graph 42. In the interest of better readability, the further description is continued on the basis of the reduced graph 42—but expressly without dispensing with any further general applicability.

Then, after the creation of the reduced graph 42, in said graph first of all the first level of the remaining subtrees below its root Z is examined. In this case it is determined whether at this level at least one node occurs precisely once. If this is not the case—as in the present situation, the next level is selected and likewise examined etc., until a level is found on which at least one node occurs precisely once.

In the simple example shown, this situation occurs on the second level of the reduced graph 42. Located here are the nodes M2 and M3 (already highlighted in the diagram in FIG. 4). Each of these two nodes only occurs once on this level. Thus the condition formulated above is fulfilled for each of these nodes.

In a subsequent method step, by manual triggering, precisely one real fire detector 10 of the correct subtree within the reduced graph 42 is determined (and also within the underlying graph 40) and thus the ambiguity is resolved. Triggering of a fire detector 10 is understood as an activation of the fire detector 10, which causes the fire detector 10 to send a response via the transmission line 14 and to the panel 12. The triggering can consist of an operating action undertaken at the respective fire detector 10, for example pressing a button on the fire detector 10 or a triggering by means of test gas, by means of an alarm tester or the like. The triggering is undertaken by a user of the method proposed here. The fire detector 10 to be triggered is specified to the user as part of the method, for example output at a display unit of a device with which the method is carried out.

Corresponding to the situation shown in the diagrams in FIG. 1 and FIG. 2 and also FIG. 5, either the node M2 or the node M3 could correspond to the fire detector 10 with the designation (or the address) “MB”.

If for example the fire detector 10 designated symbolically in the floor plan with “M2” is now triggered manually, the panel 12, in a manner known per se, receives information about this triggering. This response to the panel 12 is the basis for resolving the ambiguity.

The specific, manual triggering of precisely this fire detector 10 (and thus also the specific triggering of any other fire detector 10) is possible because the position (the installation location) of the fire detector 10 with this symbolic designation (and thus accordingly the position of any other fire detector 10) is known as a result of the floor plan data.

The above-mentioned response as a result of the manual triggering of precisely one fire detector 10 comprises a unique identification of the triggered fire detector 10, namely for example a unique identification within the framework of the protocol for data transmission along the transmission line 14, for example the bus address of the triggered fire detector 10.

To resolve the ambiguity, in a first step one of the nodes on the previously determined level of the graph 42 is selected automatically. The selected node for example could be the node M2. In response to the manual triggering of that fire detector 10, which is located at the installation location provided for the fire detector 10 with the designation M2 in accordance with the floor plan, the panel 14 receives the response “MB”. This response matches the designation “MB” at the second position of the fire detector sequence 34 and an underlying search, in the fire detector sequence 34, which leads to this result is the second step in resolving the ambiguity.

Now, in a third step, with the triggered fire detector M2 and the intermediate result “second position of the connection order”, a matching path in reduced graph 42 is sought. Each path or subtree remaining in the reduced graph 42 represents a potential connection order 44, 46—reduced by the nodes representing the panel Z. In the example shown there is a first potential connection order 44 and a second potential connection order 46. The reduced graph 42 thus comprises a number of potential connection orders 44, 46, from which, for the purpose of resolving the ambiguity, precisely one connection order 44, 46 is selected.

In concrete terms in the third step the potential connection order 44, 46 and in said order the position in accordance with the intermediate result in each case is considered. Only in the first potential connection order 44 is the node M2 located at a position to be considered in accordance with the intermediate result (“second position of the connection order”). The first potential connection order 44 thus represents the actual connection order and the ambiguity is resolved.

If on the other hand in the first step, instead of the node M2 the node M3 (located at the same level in graph 42) were to have been selected, the following situation is produced: For manual triggering of that fire detector 10, which is located at the installation location provided for the fire detector 10 with this designation in accordance with the floor plan, the panel 14 receives the response “MC”. This response matches the designation “MC” at the third position of the fire detector sequence 34. The intermediate result after the first step here is thus: “third position of the connection order”. In the third step the potential connection orders 44, 46 and in these the position in accordance with the intermediate result in each case are considered. Only in the first potential connection order 44 is the node M3 located at a position to be considered in accordance with the intermediate result (“third position of the connection order”). Here too the first potential connection order 44 has again been identified as the actual connection order and the ambiguity is likewise resolved.

Note: When the designations used as part of the method, thus the designations “MA”, “MB” etc. here, do not match a designation, as will be reported to the panel 12 after a manual triggering of a fire detector 10, for unique assignment, in a manner basically known per se, one or more lookup tables or the like are required, which on the one hand encode the designations that can be expected as a response and which comprise designations used as part of the method and encode a unique relationship between the two.

Formulated in general terms the resolution of a possible ambiguity comprises the following steps: After an automatic identification of a node occurring precisely once at a level of the reduced graph 42 and a likewise automatic selection of this node, associated fire detectors 10 according to the floor plan are triggered manually (first step). The triggered fire detector 10 sends a response. Said alarm is looked for in the fire detector sequence 34 (second step). The position of a designation corresponding to the response in the fire detector sequence 34 is an intermediate result. The potential connection orders 44, 46 are now examined at the position in accordance with the intermediate result as regards the selected node (third step). That potential connection order 44, 46 that has the node selected in the first step at the position in accordance with the intermediate result represents the actual connection order.

With the actual connection order found (either as a result of one complete path in graph 40 or after resolution of an ambiguity with a number of complete paths) a correspondence of the fire detector sequence 34 and the actual connection order is produced. Once again as a result of this correspondence—all automatically—a correspondence of the fire detector 10 designated in each case is produced. In the example shown the following correspondences are thus produced: "M1" corresponds to "MA", "M2" corresponds to "MB", "M3" corresponds to "MC", "M4" corresponds to "MD" and "M5" corresponds to "ME". These correspondences established can also be written in abbreviated form as "M1=MA" etc.

Thus—apart from the possible manual triggering of precisely one fire detector 10 in the case of a necessary resolution of an ambiguity from end to end automatically—all fire detectors 10 included in the fire alarm system are identified, in that now a unique correspondence between the real fire detectors 10 referenced by a respective designation (for example a bus address) and the designations of the fire detectors 10 provided according to the floor plan is available.

Figure 6:
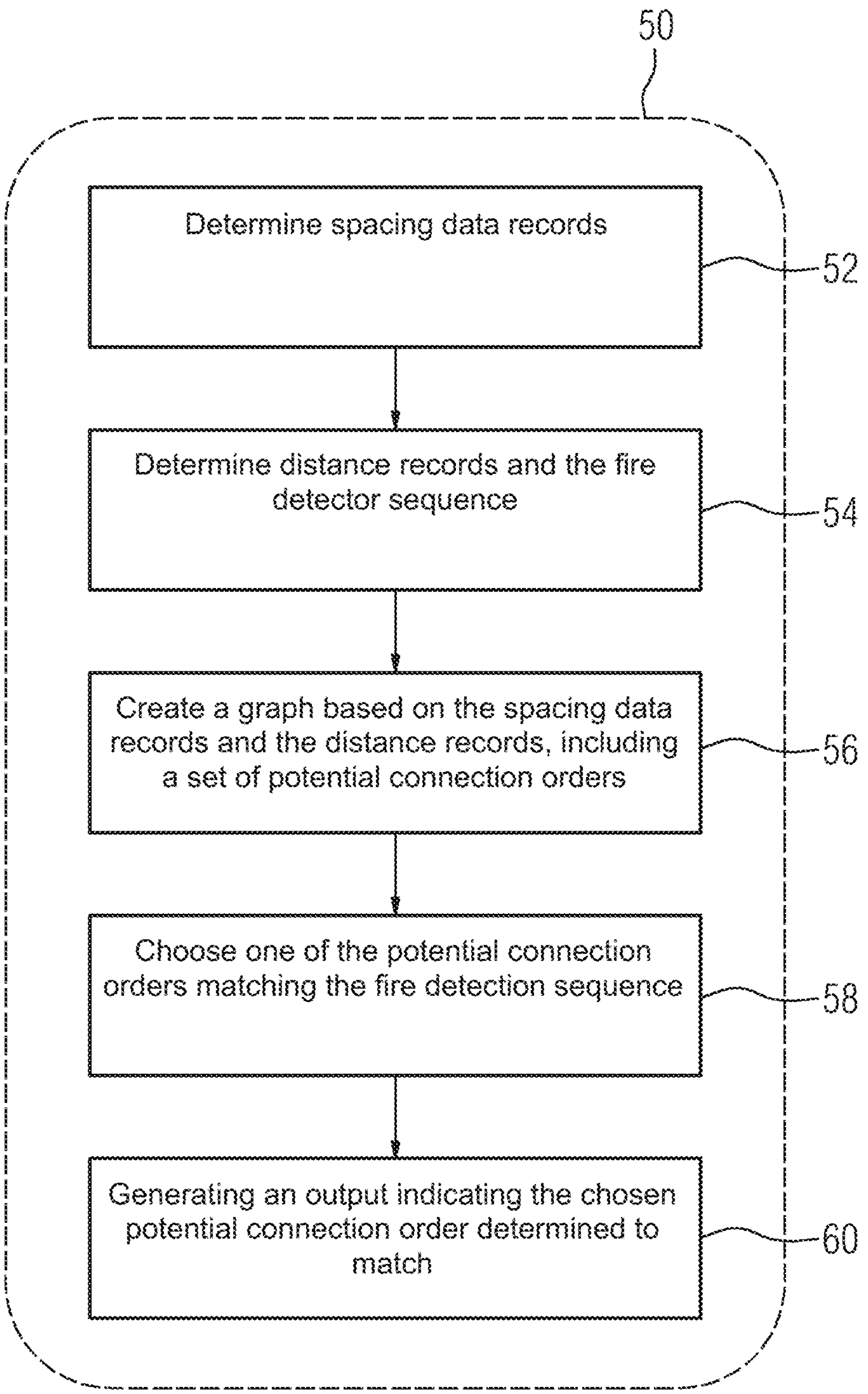
FIG. 6 shows a simplified schematic diagram of a computer program incorporating teachings of the present disclosure.

Finally, the diagram in FIG. 6, in a schematically greatly simplified form, shows a computer program 50. The computer program instructions included in the computer program 50, when executed by a computer, cause one or more of the methods described herein, to be carried out. The panel 12 of the fire alarm system or a panel from a group of a number of panels comes into consideration as the computer carrying out the method. The panel indirectly or directly has or is given access to the floor plan data. Likewise a computer or the like connected to the fire alarm system—as mentioned at the outset—comes into consideration as the computer. Such a device—not shown—is for example connected directly to the panel 12 or by connection to the transmission line 14 indirectly to the panel 12.

The computer program 50 comprises individual steps, which each comprise at least one computer program instruction—not shown—and as part of the method form a functional unit or at least functionally belong together. A first step 52 of the computer program 50 is intended for determining the spacing data records 22. A second step 54 of the computer program 50 is intended for determining the distance data records 32 and the fire detector sequence 34. A third step 56 of the computer program 50 is intended for creation of a graph 40, 42 on the basis of spacing data records 22 and the distance data records 32 as well as for a determination of a set of potential connection orders 44, 46. The order of the first two steps 52, 54 can also be swapped. The first two steps 52, 54 can also be executed—on different devices—at the same time or almost at the same time. Moreover, the first two steps 52, 54 can be integrated into the third step 56.

A fourth step 58 of the computer program 50 is intended for determining a potential connection order 44, 46 matching the fire detector sequence 34. A fifth step 60 of the computer program 50 is finally determined for output, for forwarding or generally for making available a correspondence resulting due to the potential connection order 44, 46 determined as matching. The correspondence consists of a correspondence of the designations included in the fire detector sequence 34 on the one hand and the connection order 44, 46 determined on the other hand in their order within the fire detector sequence 34 or the connection order 44, 46 determined. Thus for example the connection order and the designations included in it on the one hand and also the potential connection order 44, 46 determined as matching and the designations once again included in it are output in the respective order, forwarded, made available or the like.

Within the fourth step 58 and within the framework of the determination taking place there of a potential connection order 44, 46 matching the fire detector sequence 34 there is possibly a manual activation of a fire detector 10. Except for this manual activation of a fire detector 10, all steps of the method and thus all steps 52-60 of the computer program 50 proceed automatically. The fire detector 10 to be activated manually is displayed to a user of the method. The fire detector 10 to be activated manually is likewise determined automatically (as part of the fourth step 58 of the computer program 50) and also the fire detector 10 to be activated manually is also displayed automatically (likewise as part of this fourth step 58 of the computer program 50).

Although the teachings herein have been illustrated and described in greater detail by the exemplary embodiment, the scope of the disclosure is not restricted by the disclosed examples and other variations can be derived herefrom by the person skilled in the art without departing from the scope of protection thereof.

Individual aspects of the description submitted here that come to the fore can thus be summarized as follows: A method for automatic identification of fire detectors 10 of a fire alarm system connected to a transmission line 14 by evaluation of so-called floor plan data on the one hand and measurements along the transmission line 14 on the other hand is specified. The fire alarm system comprises as its devices a panel 12 and the fire detectors 10 connected via a transmission line 14 to the panel 12 as well as the transmission line 14. The automatic identification of the fire detectors 10 is based on spacings between the devices 10, 12 on the one hand and distances between the devices 10, 12 on the other hand. The spacings are available in the form of floor plan data or are determined on the basis of floor plan data as part of the method. The distances are determined along the transmission line 14 by measurement and within the framework of this measurement a fire detector sequence 34 is determined. By means of the spacings and the distances a graph 40, 42 with a set of potential connection orders 44, 46 is created. The fire detector sequence 34 and also the or each potential connection order 44, 46 comprise designations, which each reference a fire detector 10 connected to the transmission line 14 or a fire detector 10 provided according the floor plan data. From the set of potential connection orders 44, 46 a potential connection order 44, 46 matching the fire detector sequence 34 is determined. As a result of the potential connection order 44, 46 determined as matching there is a correspondence of the designations included in the fire detector sequence 34 on the one hand and the connection order 44, 46 determined on the other hand in their order within the fire detector sequence 34 or the connection order 44, 46 determined. This correspondence determined represents the identification of the fire detectors 10.

What is claimed is:

1. A method for automatic identification of fire detectors in a fire alarm system of a building, wherein the fire alarm system includes a plurality of fire detectors, a panel, and a transmission line, the method comprising:

determining linear distance spacings between respective fire detectors based on a floor plan;

determining line distances between respective fire detectors by measurement along the transmission line and using the line distances to determine a fire detector sequence;

creating a graph using the linear distance spacings and the line distances with a set of potential connection orders;

wherein the fire detector sequence and the potential connection orders comprise designations, which in each case reference a fire detector connected to the transmission line or a fire detector provided according to the floor plan data;

determining a potential connection order matching the fire detector sequence based on the set of potential connection orders;

determining, as a result of the potential connection orders determined as matching, a correspondence of the designations included in the fire detector sequence on the one hand and the connection order determined on the other hand in their order within the fire detector sequence or the connection order determined results;

wherein the correspondence represents the identification of the fire detectors;

generating an electronic record including a respective serial number, a respective physical location corresponding to the floor plan, and a respective network address for each fire detector; and storing the electronic record for use in operating the fire alarm system.

2. The method as claimed in claim 1, wherein:

there is a symbolic designation for each device of the fire alarm system;

spacing data records comprise the symbolic designations of two devices in each case as well as a linear distance spacing between the respective devices;

each spacing data record comprises the designations of the respective devices as beginning and end device;

line distances between the devices of the fire alarm system along the transmission line are determined by measurement and stored in the order of the measurement along the transmission line as distance data records; and wherein the graph comprises the potential connection order.

3. The method as claimed in claim 2, wherein:

for creation of the graph, in a first step a node representing the panel is set up in the graph and is designated with the symbolic designation of the panel;

the distance data records are processed one after the other according to their order;

matching spacing data records are sought for the distance data record and the designation of the last node set up in each case;

for each spacing data record found, a new node with the designation of the target device of the respective spacing data record is set up in the graph and linked to the node set up in the preceding step;

the method is continued with a new step in each case with the processing of the distance data records until all distance data records are processed.

4. The method as claimed in claim 1, wherein:

the connection of the devices to the transmission line defines a connection order and the fire detector sequence is produced as a result of the connection order;

the potential connection order matching the fire detector sequence is determined from the set of potential connection orders;

in a plurality of potential connection orders, a fire detector occurring precisely once at precisely one level of the potential connection orders is triggered manually and a designation returned as a result of such a triggering from the triggered fire detector at the position in the fire detector sequence designated by the respective level in the connection order is sought.

5. The method as claimed in claim 1, wherein the determination of the line distances by measurement is undertaken in precisely one measurement direction.

6. The method as claimed in claim 1, wherein the determination of the line distances by measurement is undertaken starting from the panel, at least in sections, in a first measurement direction and, likewise starting from the panel, at least in sections, in a second measurement direction opposite to the first measurement direction and wherein with the measurements in the first measurement direction and the second measurement direction overall all fire detectors are acquired at least once.

7. The method as claimed in claim 6, wherein:

for distance measurements along the first measurement direction, line distances between essentially a first half of the fire detectors included in the fire alarm system; and for distance measurements along the second measurement direction, line distances between the remaining second half of the fire detectors included in the fire alarm system are determined.

8. A computer program product, comprising commands or electrically readable control signals, which, when executed by a computer, cause said computer to identify fire detectors in a fire alarm system of a building, wherein the fire alarm system includes a plurality of fire detectors, a panel, and a transmission line, by:

determining linear distance spacings between respective fire detectors based on a floor plan;

determining line distances between respective fire detectors by measurement along the transmission line and using the line distances to determine a fire detector sequence;

creating a graph using the linear distance spacings and the line distances with a set of potential connection orders;

wherein the fire detector sequence and the potential connection orders comprise designations, which in each case reference a fire detector connected to the transmission line or a fire detector provided according to the floor plan data;

determining a potential connection order matching the fire detector sequence based on the set of potential connection orders; and determining, as a result of the potential connection orders determined as matching, a correspondence of the designations included in the fire detector sequence on the one hand and the connection order determined on the other hand in their order within the fire detector sequence or the connection order determined results;

wherein the correspondence represents the identification of the fire detectors;

generating an electronic record including a respective serial number, a respective physical location corresponding to the floor plan, and a respective network address for each fire detector; and storing the electronic record for use in operating the fire alarm system.

* * * * *